May 12, 1931.　　　G. J. BELKNAP　　　1,804,586
QUICK OPENING VALVE
Filed Oct. 3, 1929
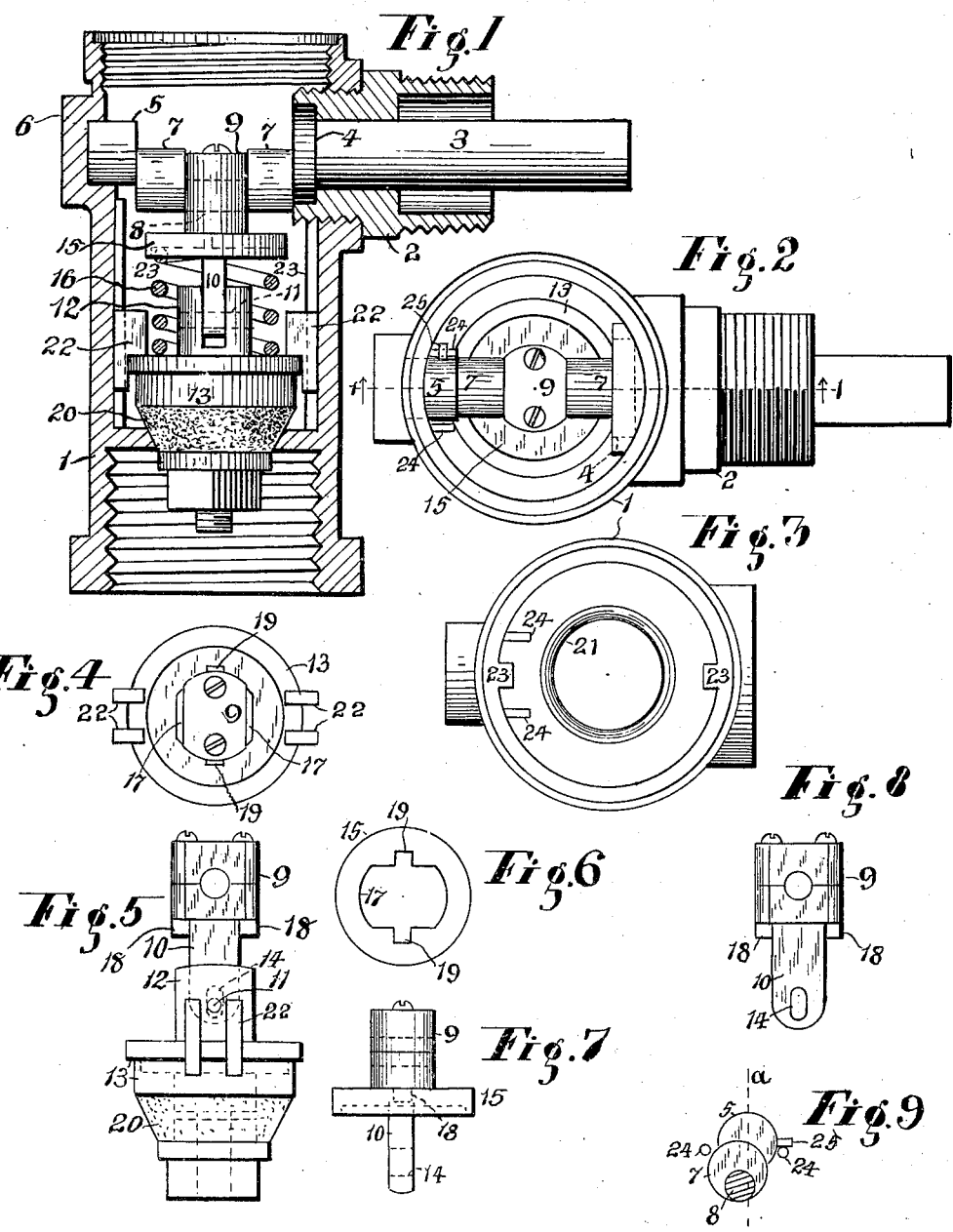
INVENTOR
George J. Belknap
BY
Geo. D. Phillips
ATTORNEY Patented May 12, 1931

1,804,586

UNITED STATES PATENT OFFICE

GEORGE J. BELKNAP, OF BRIDGEPORT, CONNECTICUT

QUICK-OPENING VALVE

Application filed October 3, 1929. Serial No. 397,135.

This invention relates to valves of the "quick opening" type, and it consists primarily in utilizing a crank shaft for rapid action in reciprocating the valve disc and seating the disc entirely by spring tension.

In describing the invention in detail reference will be had to the accompanying drawings wherein like characters of reference denote corresponding parts in the several views in which Figure 1 represents a central sectional view of the valve body and lateral bushing on line 1—1 of Figure 2—

Figure 2 is an upper plan view with the cap removed showing the interior of the body with the installed crank in operative position—

Figure 3 is an upper plan view of the body showing the valve seat—

Figure 4 is a plan view of the disc holder, crank connection and intermediate plate or washer—

Figure 5 is an elevated view of the disc holder and disc, and the crank connection with the intermediate plate removed—

Figure 6 is a plan view of the intermediate plate—

Figure 7 is an edge view of the crank connection mounted on the plate—

Figure 8 is a side view of the crank connection, and

Figure 9 is an end view of a part of the crank shaft and a transverse sectional view of the crank pin.

1 represents an ordinary valve body and 2 is a bushing detachably secured thereto. The crank shaft 3 and its integral collar 4 are journaled in the bushing 2, while the inner concentric end 5 of the crank shaft is journaled in the opposite recess 6 of the valve body. 7 represents the throw of the crank and the integrally connected pin 8.

The head 9 of the crank connection is journaled on the crank pin 8 with its tail piece 10 pivotally mounted on the pin 11 passing transversely through the forked hub 12 of the disc holder 13 and the elongated opening 14, Figures 5 and 8, of the tail piece 10.

15 is a plate or washer intermediate the head 9 of the crank connection and the disc holder 13, and 16 is a spring located between said washer and disc holder and is always under tension.

In assembling the device, the spring is compressed and the head 9 passed through the elongated opening 17, Figure 6, of the washer 15 and is then turned until the lugs 18, Figures 5 and 8, of the head, drop into the side notches 19 of the washer to permit the head 9 to rest in locked position on said washer and thus maintain a constant tension of the assembled spring.

As the crank has but a limited movement it could not be depended upon to seat the valve disc 20, consequently the crank shaft will leave the disc above its seat 21, shown in Figure 3, to be fully and accurately seated entirely by the spring, as shown in Figure 1, with the pin 11 and its relation with the slot 14 of the member 10, as shown in Figure 5, in readiness for unseating the disc by means of the crank shaft.

The opposed ears 22 on the disc holder 13 register with the vertical ribs 23, Figure 3, for guiding the vertical movements of the disc holder.

24 are crank shaft engageable pins projecting from the interior wall of the valve body, Figures 2 and 3, to be alternately engaged by the pin 25 carried by the end 5, Figures 2 and 9, of the crank shaft, to limit the throw of the shaft in either direction, and to place the center of the crank pin 8 at the left of the center line $a$, Figure 9, to prevent the spring unseating the crank shaft from its position, shown in Figure 9, when the valve is closed. The initial valve opening movement made by the crank shaft will place the center of the crank pin 8 at the right of said center line and the spring will then assist in throwing the shaft over in contact with the opposite pin and unseating the disc.

Having thus described my invention what I claim is:—

1. A quick opening valve of the character described, comprising a valve body, a crank shaft journaled therein, a disc holder, a disc therefor, a crank connection journaled on the crank shaft and adjustably pivoted on the disc holder to permit of an independent movement of said crank connection and disc holder, and a spring interposed between said crank connection and disc holder for seating the disc independently of the crank shaft.

2. A quick opening valve of the character described, comprising in combination, a body having a valve seat, a crank shaft journaled in the body, a disc holder, a disc therefor, a crank connection having a head journaled on the crank shaft and a tail piece adjustably pivoted to the disc holder to permit of an independent movement of said crank connection and disc holder, a washer underlying the crank connection head, and a spring located between the washer and disc holder to seat the disc independently of the crank shaft.

3. A construction as in claim 2, comprising crank shaft engageable pins within the valve body to be alternately engaged by a pin carried by the crank shaft to limit the throw of the shaft in either direction, and to place the crank out of spring control.

4. A construction as in claim 2 wherein the crank connection head is provided with depending lugs, and the washer with an elongated opening to admit the head, and opposed notches leading from said opening to admit said lugs so that said head may rest in locked position on the washer and thus maintain the spring under constant tension.

In testimony whereof I affix my signature.

GEORGE J. BELKNAP.